US 6,490,455 B1

(12) United States Patent
Park et al.

(10) Patent No.: US 6,490,455 B1
(45) Date of Patent: Dec. 3, 2002

(54) APPARATUS AND METHOD FOR DETECTING A MOBILE PHONE IN IDLE STATE

(75) Inventors: Young-Soo Park, Seoul (KR); Yun-Hee Lee, Sungnam (KR); Sang-Hwan Park, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/240,030

(22) Filed: Jan. 29, 1999

(30) Foreign Application Priority Data

Oct. 20, 1998 (KR) .......................................... 98-43930

(51) Int. Cl.[7] .......................... H04Q 7/20; H04M 1/66; H04M 11/00
(52) U.S. Cl. ........................ 455/456; 455/411; 455/461; 370/342
(58) Field of Search .......................... 370/342; 455/411, 455/414, 432, 456, 461, 88, 421, 229, 67.1, 67.7, 1, 63, 517, 561, 565, 437; 340/539

(56) References Cited

U.S. PATENT DOCUMENTS

| 4,675,656 | A | * | 6/1987 | Narcisse ..................... 128/903 |
| 4,728,959 | A | | 3/1988 | Maloney et al. |
| 4,799,059 | A | | 1/1989 | Grindahl et al. |
| 5,119,504 | A | | 6/1992 | Durboraw, III |
| 5,121,126 | A | | 6/1992 | Clagett |
| 5,218,716 | A | | 6/1993 | Comroe et al. |
| 5,398,276 | A | | 3/1995 | Lemke et al. |
| 5,463,672 | A | * | 10/1995 | Kage ........................... 455/458 |
| 5,502,758 | A | | 3/1996 | Tsuzuki et al. |
| 5,608,410 | A | | 3/1997 | Stilp et al. |
| 5,610,969 | A | | 3/1997 | McHenry et al. |
| 5,740,539 | A | | 4/1998 | Ishii |
| RE35,916 | E | | 10/1998 | Dennison et al. |
| 5,903,844 | A | * | 5/1999 | Bruckert et al. ............. 455/456 |
| 6,011,973 | A | * | 1/2000 | Valentine et al. ....... 342/357.07 |
| 6,163,695 | A | * | 12/2000 | Takemura ................... 455/422 |
| 6,169,733 | B1 | * | 1/2001 | Lee ............................. 370/342 |
| 6,188,883 | B1 | * | 2/2001 | Takemura ................... 455/411 |
| 6,192,244 | B1 | * | 2/2001 | Abbadessa .................. 455/424 |
| 6,212,390 | B1 | * | 4/2001 | Rune ........................... 455/410 |
| 6,249,245 | B1 | * | 6/2001 | Watters et al. .......... 342/357.03 |
| 6,343,213 | B1 | * | 1/2002 | Steer et al. .................. 455/411 |

\* cited by examiner

Primary Examiner—William Trost
Assistant Examiner—Simon Nguyen
(74) Attorney, Agent, or Firm—Dilworth & Barrese, LLP

(57) ABSTRACT

A method and apparatus for detecting mobile phone in an Idle State are disclosed. A signal-generating unit generates a pseudo base station signal for transmission to a mobile phone in a detection area. A detecting unit detects a response signal that the mobile phone transmits in response to the pseudo base station signal. An alarm-generating unit generates an alarm when the detecting unit detects the response signal. Preferably, the pseudo base station signal includes new zone information, such that the mobile phone responds by transmitting a location registration signal which is detected by the detecting unit. The method and apparatus are advantageous in that they can apprise a mobile phone user within a specific area that the user's mobile phone is turned on, by detecting the mobile phone in Idle State passing a detection area. The method and apparatus may prevent public injury or interference with electronic equipment by restricting mobile phone use in a building or airplane.

28 Claims, 9 Drawing Sheets

FIG. 10
(A)
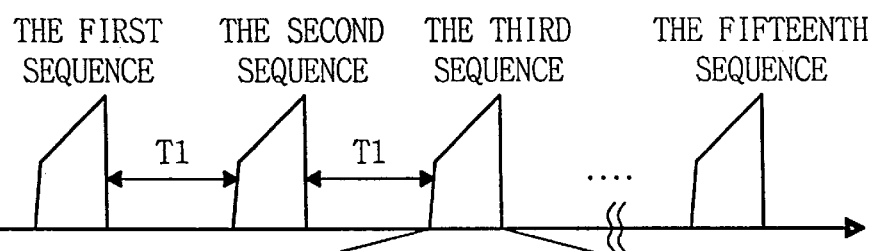
(B)
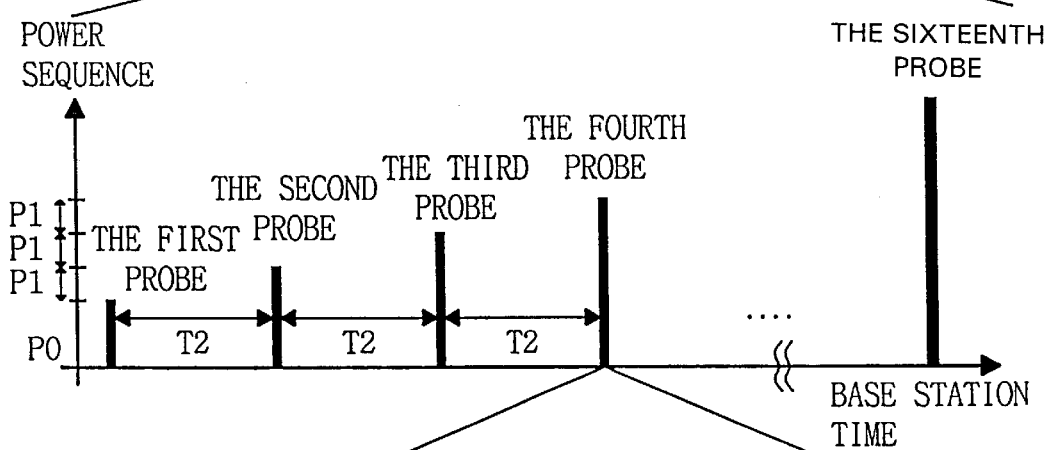
(C)
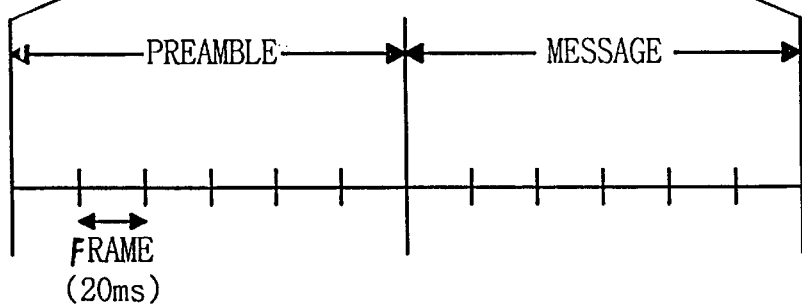

APPARATUS AND METHOD FOR DETECTING A MOBILE PHONE IN IDLE STATE

BACKGROUND OF THE INVENTION

The present invention relates to a method and apparatus for detecting a mobile phone in an Idle State, and in particular, for generating an alarm when the phone in Idle State enters an area where the usage of the mobile phone is prohibited.

A typical cellular telephone system includes a plurality of base stations, each of which services a geographical cell of a small-scale area, thereby providing coverage over a wide area encompassed by a multiplicity of such cells. The base stations are centrally controlled by a mobile switching center (MSC) so that a mobile phone subscriber can maintain communication when moving between cells.

Cellular phone systems are advantageous in that they provide service to mobile phone subscribers within any cell covered by the system. However, a drawback to the cellular system is that it may do harm to the public order in an area where usage of the mobile phone is prohibited. For example, if a mobile phone rings while receiving a call in a concert or exhibition hall, the resulting noise is a disturbance to the performance. Additionally, mobile phone signal transmissions may interfere with the operation of sensitive electronic equipment such as in a hospital or an airplane. Such electronic equipment can be adversely affected by traffic channel signals as well as control channel signals, such as those sent back and forth between mobiles and base stations during the call set-up process, or during the registration process when a mobile phone is first turned on.

One conventional technique to restrict use of a mobile phone in a specific area is to employ an apparatus for generating an interference signal to essentially "jam" the mobile phone and thereby prevent it from operating properly. FIG. 1 shows an embodiment illustrating a prior art apparatus for generating an interference signal for this purpose. An apparatus 11 generates an RF interference signal so as to prevent use of a mobile phone inside a building 10. However, in general, buildings have windows or other entrances for radio waves from the exterior. As such, with the approach of FIG. 1, it is impossible to completely shut out radio frequency entering from external base stations attempting to communicate and/or send control channel signals to mobile phones within the building. Another problem is that the RF interference signal generated by apparatus 11 may cause other electronic equipment to malfunction.

Another prior art technique for restricting mobile phone use involves the deployment of magnetic material detectors in selected locations to detect the presence of mobile phones, which have magnetic material therein. FIG. 2 shows an embodiment of an apparatus for detecting magnetic substances. When a body possessing an object 24 having magnetic components enters through an entrance 21, a magnetic detector 22 established inside the entrance 21 detects the magnetic components and transmits an alarm signal to an alarm generator 23, which then sounds an alarm. A drawback to this approach is that it will detect such phones and sound an alarm regardless of whether the phones are in use.

Traditionally, in such restricted use environments, announcements are made to the public exhorting mobile phone owners to shut off power to their phones, but inevitably, some phones remain turned on. Hence, there is a need for a system that automatically detects use of a mobile phone in the Idle State in public areas.

SUMMARY OF THE INVENTION

The present invention is directed to a method and apparatus for detecting the presence of a mobile phone in an Idle State, in which the mobile phone is powered up but not performing communication. Embodiments of the invention render it possible to detect, for example, a mobile phone in the Idle State within a specific indoor area, or upon entering an entranceway.

In an illustrative embodiment of the invention, there is provided an apparatus for detecting a mobile phone in an Idle State, which apparatus includes a signal-generating unit that generates a pseudo base station signal for transmission to a mobile phone in a detection area. A detecting unit detects a response signal that the mobile phone transmits in response to the pseudo base station signal. An alarm-generating unit generates an alarm when the detecting unit detects the response signal. Preferably, the pseudo base station signal is an overhead channel signal that includes new zone information, such that the mobile phone responds by transmitting a location registration signal which is detected by the detecting unit. The method and apparatus are particularly advantageous in a code division multiple access (CDMA) system.

The apparatus may further include a GPS receiver for receiving time information from a satellite and generating a system reference clock, and circuitry for receiving and analyzing neighboring base station information transmitted by such base stations in overhead channels. In this case, the signal generating unit generates the pseudo base station signal using the system reference clock and neighboring base station information. The pseudo base station signal may be transmitted in a plurality of frequency channels of the communication system to ensure successful reception by the mobile station. In addition, the detection unit may sequentially tune to a plurality of access channels to ensure reception of the location registration signal.

Other objects and advantages of the invention will become apparent upon reading the detailed description and upon reference to the drawings.

BRIEF DESCRIPTION OF THE DRAWINGS

The following detailed description, given by way of example and not intended to limit the present invention solely thereto, will best be appreciated when read in conjunction with the accompanying drawings in which like reference numerals denote similar or identical parts or features, wherein:

FIG. 10 shows waveforms illustrating a location registration signal of a mobile phone.

DETAILED DESCRIPTION OF THE PREFERRED EMBODIMENTS

Figure 1:
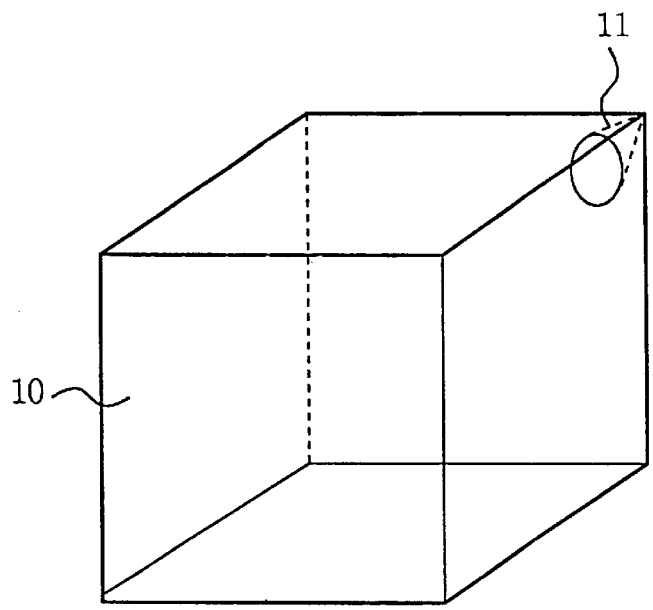
FIG. 1 illustrates a prior art system that generates an interference signal to prevent use of a mobile terminal.
Figure 2:
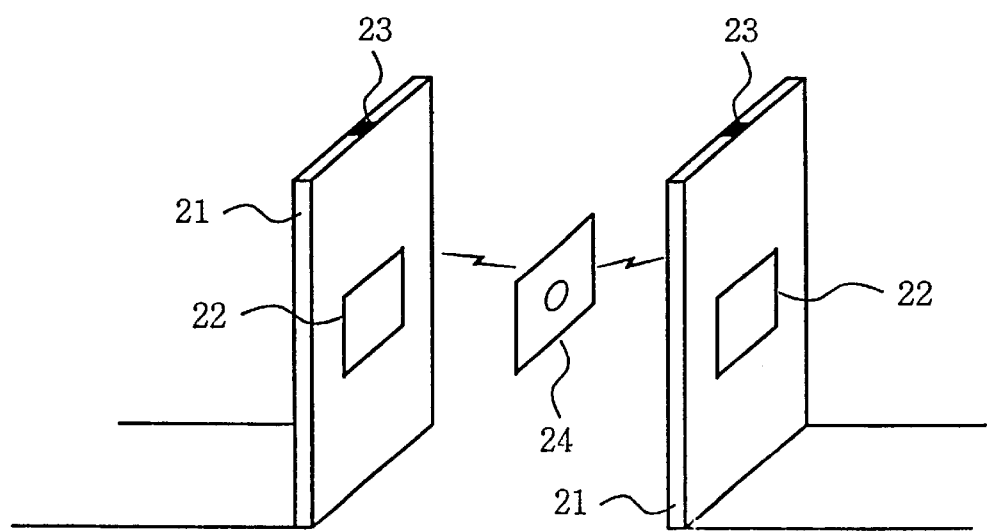
FIG. 2 depicts a prior art system for detecting magnetic objects.

The present invention provides a way to monitor whether a mobile phone in a specific detection area is in an Idle State. An Idle State is generally defined as a state in which the mobile phone is powered-up in a standby mode, but is not engaged in active voice communication. In the Idle State the mobile phone is waiting for an incoming call that is detected through reception and analysis of control channel signals transmitted by the base station. As soon as control signals indicative of an incoming call are received by the mobile phone, a call set-up process commences in which the mobile terminal and base station begin exchanging messages. Thus, the present invention, by detecting the Idle State condition, serves to prevent subsequent transmission of radio signals by the mobile terminal. On the other hand, if the mobile phone's power is off, it is not registered with the local base station so the base station will not transmit any signals to the mobile phone, and vice versa. Therefore, the present invention is not designed to detect this condition. Also, if the mobile phone is powered-on and communication is already being performed, typically a supervisor in the restricted area or building can detect such mobile phone use without any specific means, so it is not considered in the present invention either. An apparatus according to the present invention makes it possible to inform the mobile phone user or the supervisor in the restricted area or the like that the mobile phone is powered-on, by generating an alarm when the mobile phone in the restricted area is detected in the Idle State.

An illustrative embodiment of the present invention will be described below in the context of a code division multiple access (CDMA) communication system. However, it is to be understood that the present invention is not so limited, and may be used in conjunction with other communication protocols such as a time division multiple access (TDMA) system.

In a code division multiple access (CDMA) system, the reverse channel, which is the communication link from the mobile phone to the base station, includes an access channel and a traffic channel. The access channel is a channel which enables the mobile phone to obtain information to communicate with the base station. The traffic channel is used to send and receive practical voice data to/from the base station after communication is established through the access channel. The present invention detects a mobile phone in the Idle State by using the initial signal that the mobile phone transmits through the access channel to a base station. This initial signal in the access channel is typically a signal requesting registration with a new base station, as will be explained further below.

The mobile phone in Idle State receives system parameters from the wirelessly connected base station when the mobile phone's power is initially on. The connected base station is assumed to be the base station that primarily serves the cell in which the mobile phone is located. (Base stations have overlapping coverage areas, so it is possible for different base stations to service a mobile phone at a given location.) The system parameters include frequency to be tuned to by the mobile phone, pseudorandom noise (PN) code offset to identify each base station, etc. The mobile phone, having received the system parameters, maintains operation in the Idle State, continuing to receive signals from the base station. The mobile station in Idle State receives a pilot signal from the base station, where the pilot signal contains the base station's own PN code offset information.

At this time, if a second pilot signal using the same frequency is received from a neighboring base station with higher signal strength than the pilot signal of the present base station, where the second pilot signal has different PN offset information, the mobile phone tunes to the neighboring base station. The switchover of a mobile phone in Idle State between base stations is called Idle handoff. The mobile phone performing the Idle handoff does not send any signal to the base station—it just receives parameters from the new base station and stores them.

The mobile phone moving between base stations, if necessary, registers its location to a mobile switching center through one of the base stations such that only that one base station or its neighboring base stations will be called when the mobile switching center calls the mobile phone. That is, location registration is performed for the purpose of facilitating call delivery to the mobile phone in Idle State. Signals for location registration are transmitted to the base station only by mobile phones in Idle State.

In accordance with the present invention, a detection apparatus is provided which determines if a mobile phone is in the Idle State by detecting whether a location registration signal is transmitted from the mobile phone. The detection apparatus "tricks" the mobile phone into transmitting a location registration signal when the mobile phone passes through a detection area, by sending a pseudo (or "dummy") base station signal to the mobile phone.

The general process for performing location registration by a mobile phone operating in a CDMA system is as follows. A parameter-based location registration is performed when the system parameters received from a new base station differ from the system parameters already set up with the mobile phone. An order-based location registration is performed when a location registration is ordered for a specific mobile phone on the instructions of the base station. A timer-based location registration is performed whenever a specific time passes after performing the last location registration. In general, the location registration is performed every two hours, so the probability for the mobile phone to send the location registration signal within a particular one-second time frame is $1/7200$.

A zone-based location registration is performed when the mobile phone enters a new zone. A cellular system divides the overall service area into several zones and allocates a zone number characteristic for each zone. The base stations located in a specific zone transmit a common zone number associated with that zone through the paging channel.

The embodiment described herein is implemented in a zone-based location registration system to enable the mobile phone to be effectively tricked into transmitting a location registration signal when it enters a specific detection area. A detection apparatus according to the present invention includes a signal generating unit that transmits a pseudo base station signal including a new zone number which has not been used in the cellular system. The mobile phone in Idle State, when in the detection area, receives the signal and recognizes that a new zone has been entered. The mobile phone responds by transmitting a location registration signal through the access channel for the purpose of registering in the new zone. The mobile phone signal is detected by the detection apparatus, and an alarm is sounded to indicate that the mobile phone has not been turned off in the restricted area.

Each zone in a code division multiple access (CDMA) system is classified according to the zone number, a system identifier (SID) to identify the system providers, and a network identifier (NID) to identify the networks of the mobile switching center. The mobile phone receives values for these parameters from the base station and compares them to values currently stored. If any of the new values is different from the stored ones, it is determined that the mobile phone has entered a new area, whereupon a location registration to a base station in the new area is performed.

In light of the above, an illustrative detection apparatus according to the present invention is equipped with circuitry for receiving and analyzing information transmitted from neighboring base stations. Such information includes each neighboring base station's zone number, system identifier and network identifier, the transmit frequency status, the pilot signal strength, the PN code offset, etc. The detecting apparatus then selects area information different from that of the neighboring base stations.

A preferred embodiment of the present invention will now be described in detail with reference to the drawings.

Figure 3:
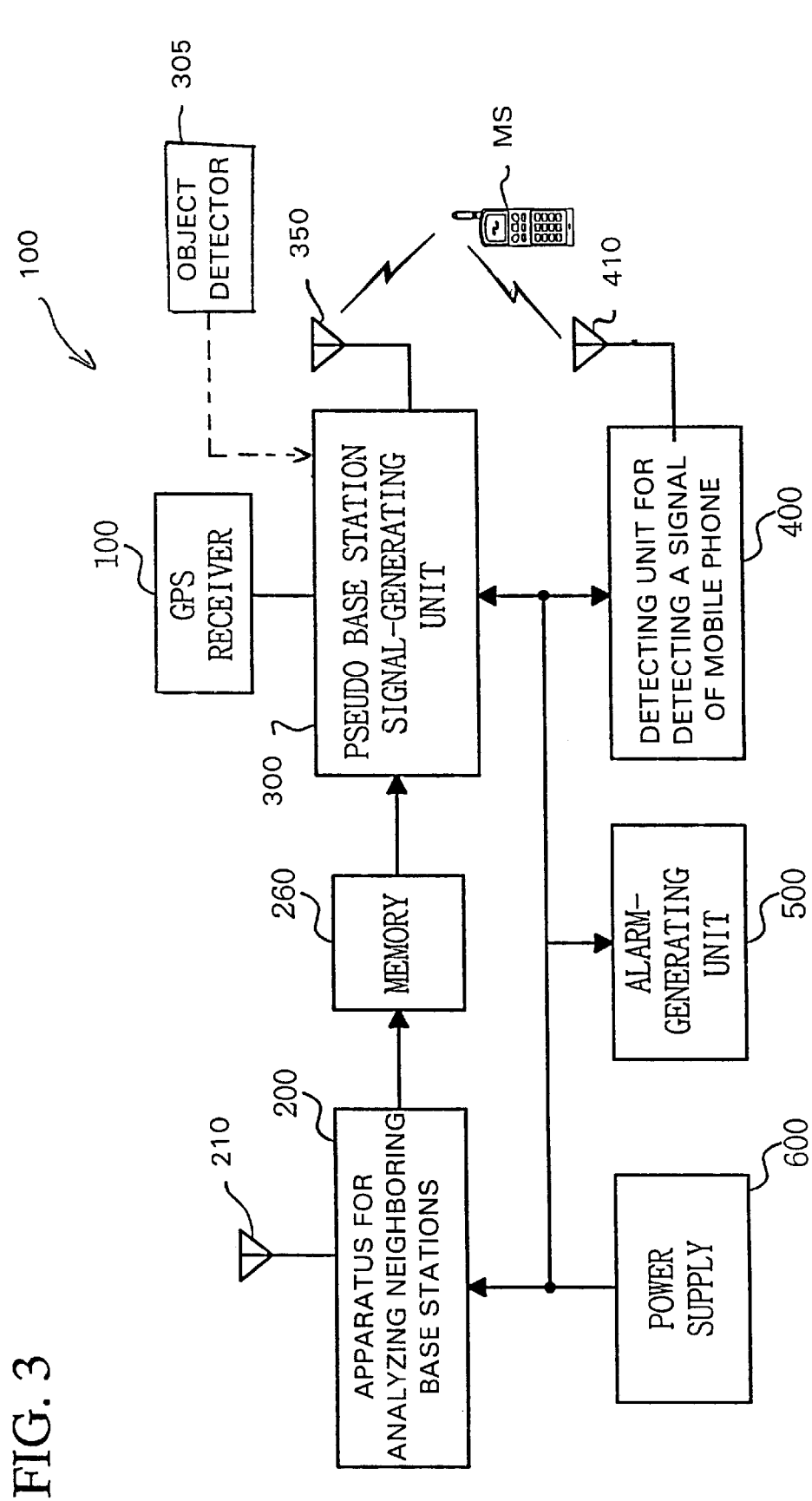
FIG. 3 is a block diagram of an embodiment of an apparatus for detecting mobile phones in accordance with the present invention.

FIG. 3 is a block diagram of an embodiment of an apparatus, 100, for detecting a mobile phone in Idle State according to the present invention. A GPS receiver 110 receives time information from satellites and generates a system reference clock. An apparatus 200 for analyzing neighboring base stations receives overhead channel signals from neighboring base stations through antenna 210, and analyzes the same to generate neighboring base station information. This information is stored in memory 260. A signal-generating unit 300 generates a pseudo base station signal based on the system reference clock and the neighboring base station information. The pseudo base station signal is transmitted to a mobile phone in the detection area via antenna 350. A mobile phone MS in Idle State responds to the pseudo base station signal by transmitting a location registration signal, which is detected by a detecting unit 400 via antenna 410. An alarm-generating unit 500 generates an alarm when detecting unit 400 detects a location registration signal transmitted by the mobile phone in response to the pseudo base station signal. A power supply 600 supplies operating power to the various components of apparatus 100.

Antennas 350 and 410 are preferably situated in a location of the restricted area such that isolated transmission and reception of signals to and from a particular mobile phone in the restricted area can be carried out. For instance, antennas 350 and 410 may be located on the perimeter of an entranceway to achieve transmission/reception of signals to/from mobile phones carried by persons passing through the entranceway. To reduce the occurrences of unintentional communication with mobile phones outside the restricted area, and the possibility of interference with other electronic equipment, transmitting antenna 350 is preferably designed with a narrow beam that points to the restricted area. Optionally, RF emissions are minimized to reduce such interference by deploying an object detector 305 in the entranceway or the like to detect the presence of a mobile phone or a person in the first place, prior to any radiation by antenna 350. Whenever an object is detected, object detector 305 sends a corresponding signal to signal-generating unit 300, which responds by transmitting the pseudo base station signal through antenna 350. Object detector 305 may operate, for example, by recognizing a change in weight or light in the detection area.

Figure 4:
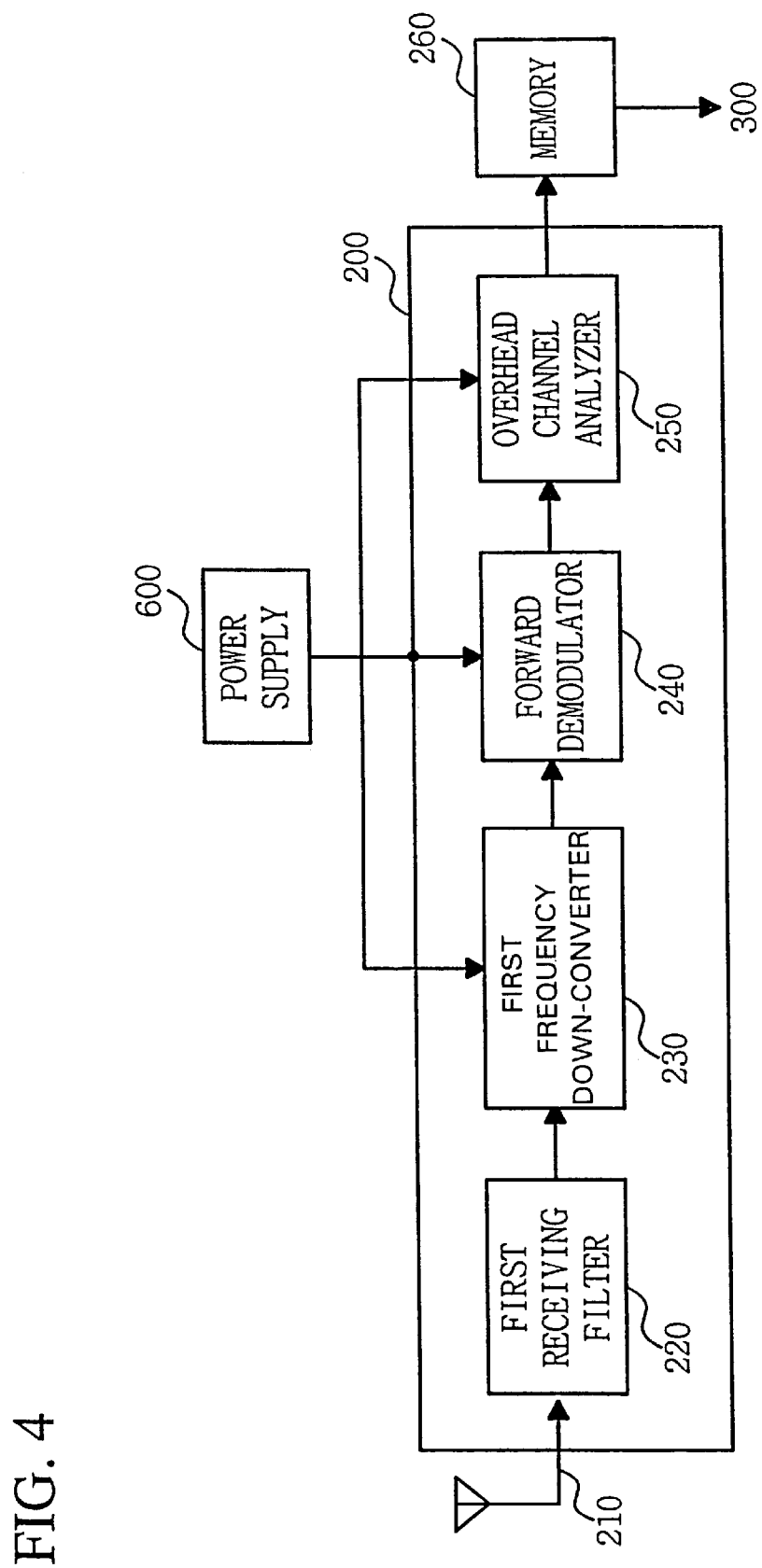
FIG. 4 is a block diagram of an illustrative apparatus 200 for analyzing neighboring base stations in accordance with the invention.

Referring now to FIG. 4, a block diagram of an embodiment of the apparatus 200 for analyzing neighboring base stations is shown. Receiving antenna 210 receives RF signals through the overhead channel(s) from neighboring base stations. A first receiving filter 220 excludes out-of-band signals from the received RF signals. First frequency down-converter 230 converts the filtered signal output by filter 220 to a baseband signal. A forward demodulator 240 demodulates the baseband signal by means of a despreading operation. An overhead channel analyzer 250 analyzes the overhead channel information of the demodulated signal so as to extract the neighboring base station information.

Figure 5:
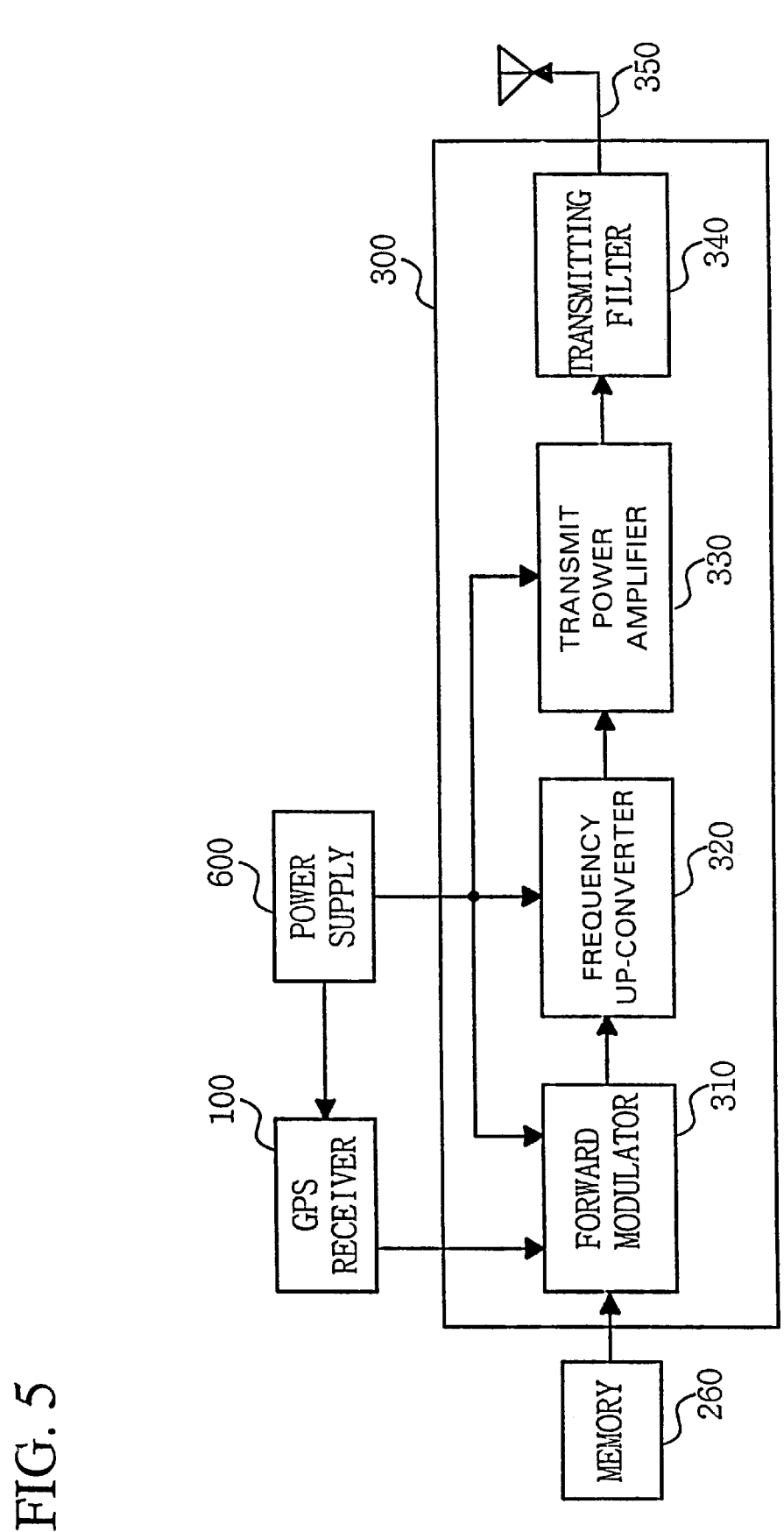
FIG. 5 depicts an embodiment of apparatus 300 for generating a pseudo base station signal in accordance with the invention.

FIG. 5 is an exemplary embodiment of the signal-generating unit 300 which generates a pseudo base station signal in accordance with the invention. The unit 300 includes a forward modulator 310 for generating an overhead channel signal using the reference clock received from GPS receiver 100 and the neighboring base station information retrieved from memory 260. A frequency up-converter 320 converts the overhead channel signal to an RF signal at an appropriate frequency used by the CDMA system. The up-converted pseudo base station signal is amplified by transmit power amplifier 330, filtered by transmitting filter 340 and radiated in the detection area by antenna 350.

Figure 6:
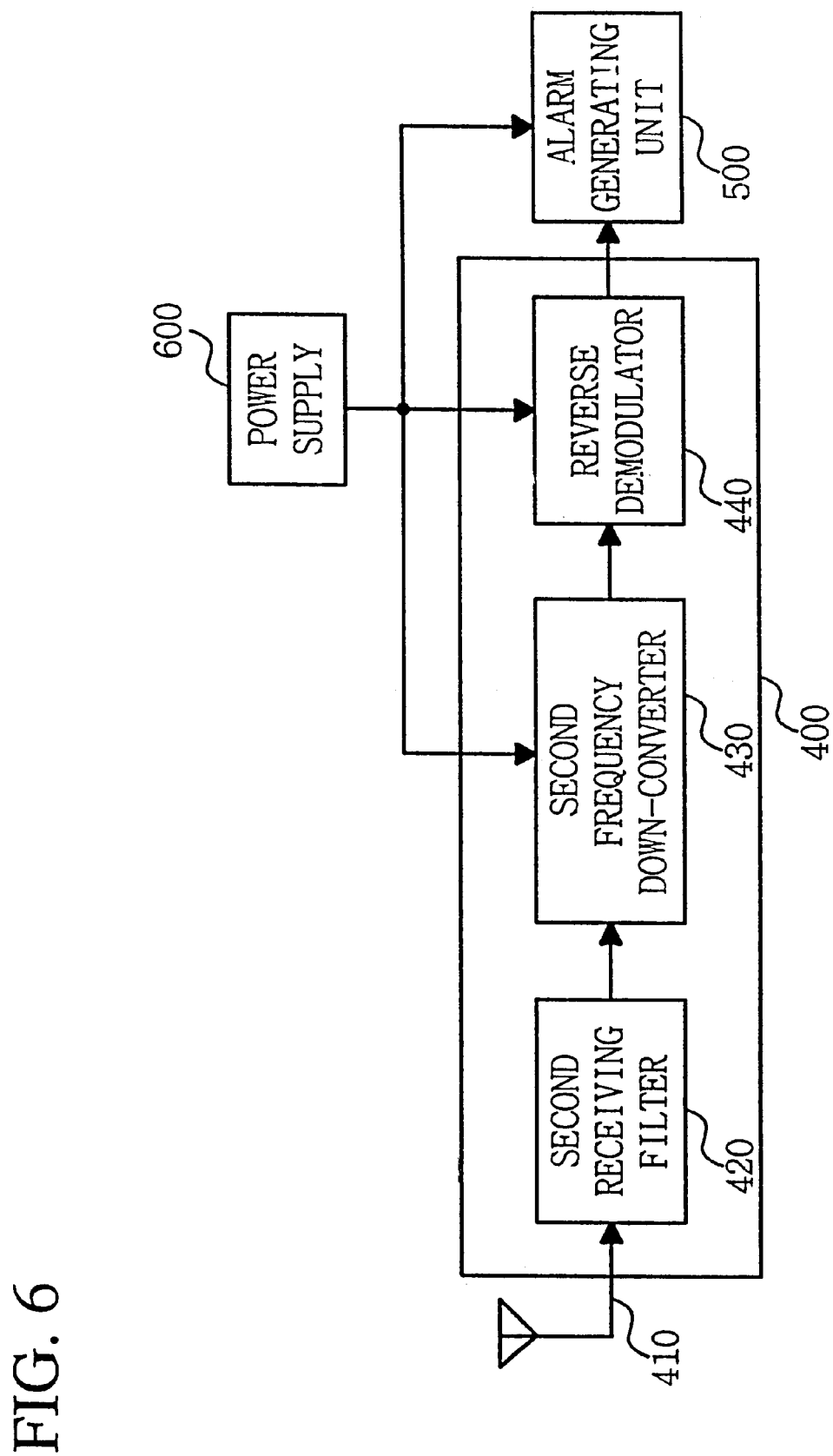
FIG. 6 is a block diagram of an embodiment of apparatus 400 for detecting a signal sent by a mobile phone.

With reference now to FIG. 6, an embodiment of detecting unit 400 is illustrated in a block diagram. A second receiving antenna 410 receives RF signals in the access channel from a mobile phone in Idle State. The received RF is filtered by second receiving filter 420 and down-converted to baseband by a second frequency down-converter 430. Reverse demodulator 440 despreads the baseband signal and activates an alarm-generating unit 500 if the information contained within the baseband signal corresponds to a location registration signal. Processing circuitry for making this determination resides either within the reverse demodulator 440 or within the alarm unit 500.

Figure 7:
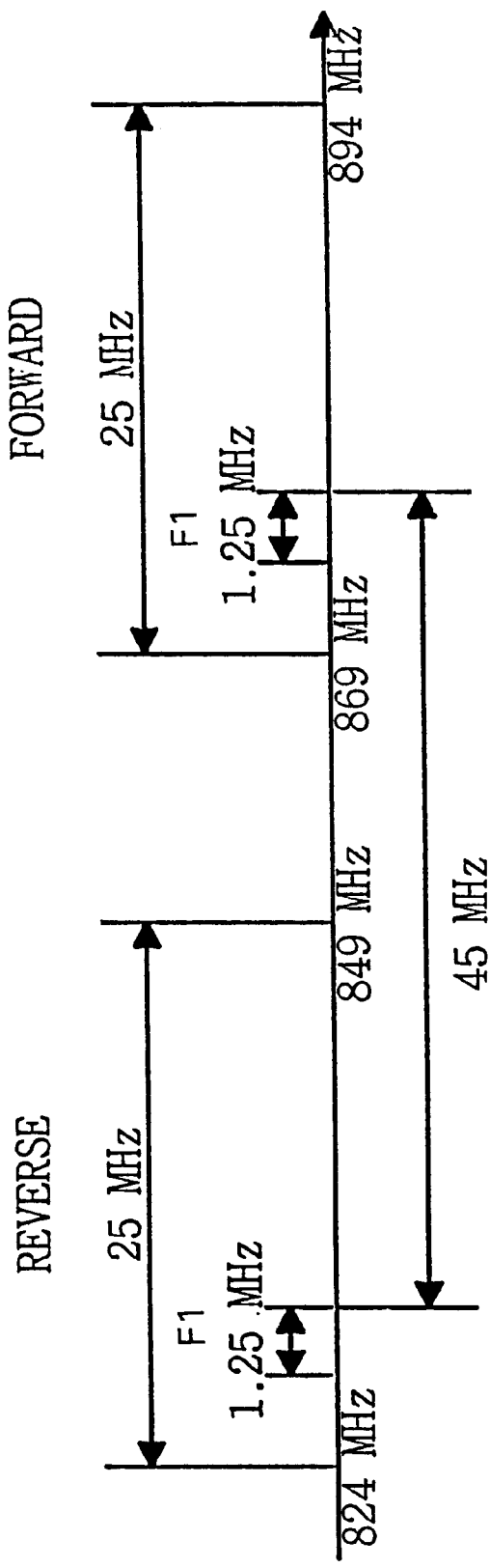
FIG. 7 illustrates forward and reverse frequency channels of a code division multiple access (CDMA) system.
Figure 8:
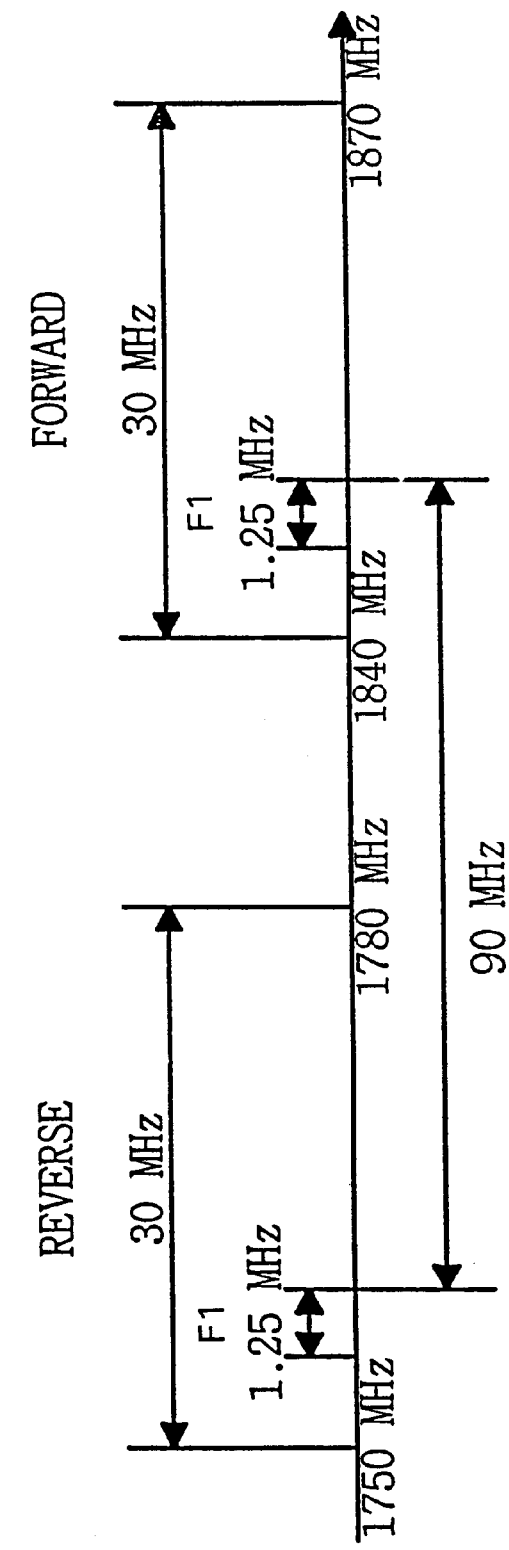
FIG. 8 illustrates forward and reverse frequency channels of personal communication services (PCS) system.

In order to detect signals from mobile phones and base stations transmitted at all possible frequencies in the CDMA system, detection apparatus 100 searches all usable frequencies in the CDMA system. At present, there are two frequency bands commonly allocated for CDMA wireless communications: the cellular system 800 MHz band and the personal communication service (PCS) system 1800 MHz band. As illustrated in FIG. 7, in the cellular system the reverse channel from the mobile phone to the base station uses a 25 MHz band between 824 MHz and 849 MHz and the forward channel from the base station to the mobile phone uses a 25 MHz band between 869 MHz and 894 MHz. As illustrated in FIG. 8, in the PCS system the reverse channel uses a 30 MHz band between 1750 MHz and 1780 MHz and the forward channel uses a 30 MHz band between 1840 MHz and 1870 MHz. The frequency separation between the forward and reverse channels is 45 MHz in the cellular system and 90 MHz in the PCS system. In both the cellular and PCS systems, CDMA frequency bands with 1.25 MHz wide bandwidths may be used for each frequency channel. For example, if the transmit frequency of the base station is F1, the transmit frequency of the mobile phone to respond to the F1 signals should be (F1 plus 45) MHz in the cellular system or (F1 plus 90) MHz in the PCS system. Therefore, up-converter 320, down-converters 230, 430, transmitting filter 340, and receiving filters 220, 420 operate in 1.25 MHz intervals within a 55 MHz range (which is derived from 25 MHz plus 30 MHz). For instance, receiving filters 220 and 420 are each bandpass filters with an electronically controlled passband (1.25 MHz wide), the center frequency of which is sequentially translated in steps of 1.25 MHz to sequentially capture the signals of adjacent channels. The other components likewise operate in 1.25 MHz intervals to obtain complete coverage over the whole CDMA band(s). Transmitting filter 340 and receiving filter 420 operate with 45 MHz (or 90 MHz) separation; likewise, up-converter 320 and down-converter 430 operate with 45 MHz (or 90 MHz) separation.

Figure 9:
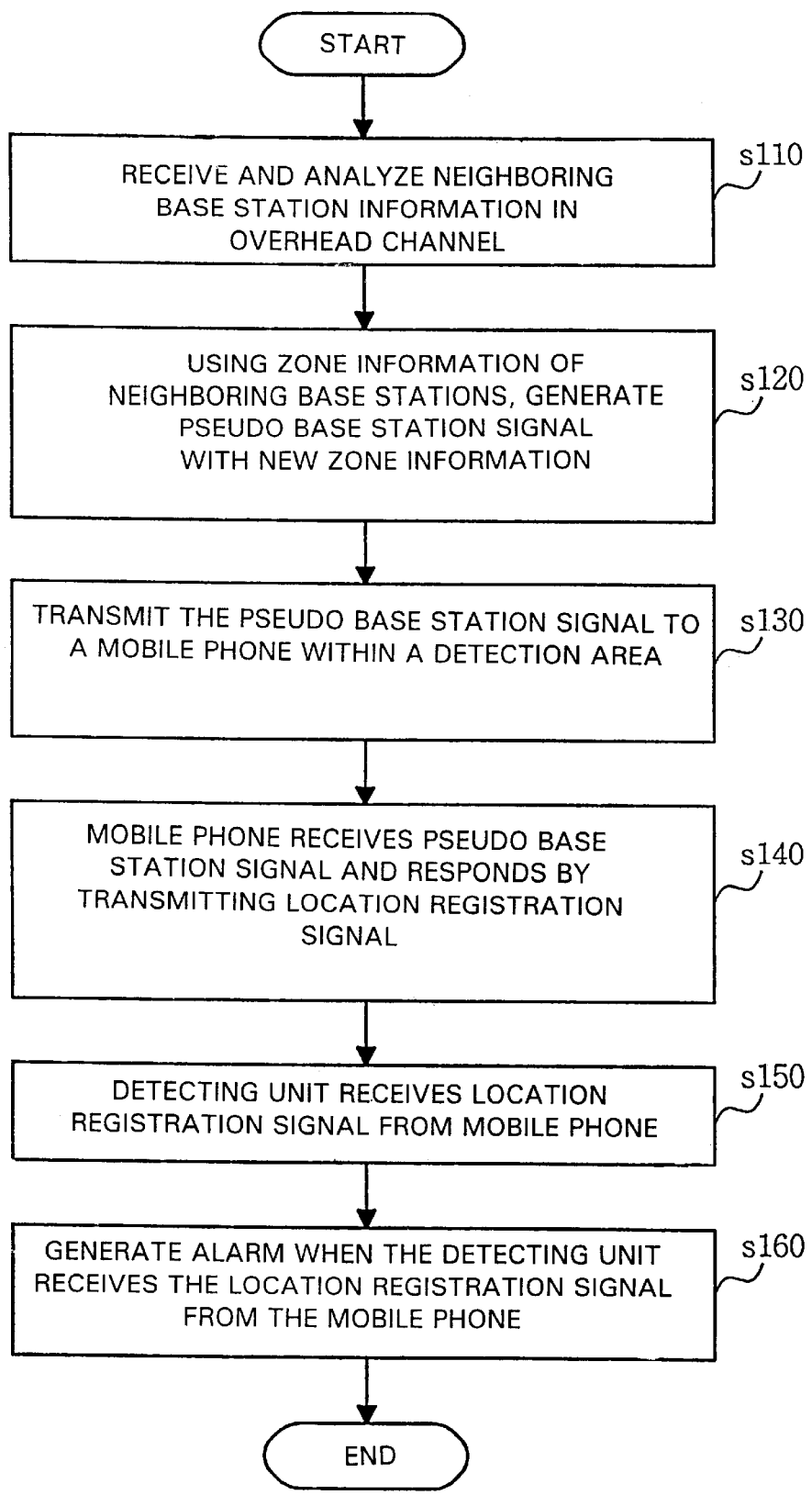
FIG. 9 is a flow chart of an exemplary method for detecting a mobile phone according to the present invention.

Referring to FIG. 9 (to be read in conjunction with FIGS. 3–8), a flowchart of an illustrative method for detecting a mobile phone in the Idle State according to the present invention is presented. The method begins in step s110, in which information is received by antenna 210 in overhead channels from neighboring base stations in the general vicinity of the detection apparatus. This information, which is received and analyzed by apparatus 200 of FIG. 3, includes zone information, PN codes, etc. of the neighboring base stations. Apparatus 200 also analyzes the signal strengths of the respective pilot signals and stores the signal strength information in memory 260. The signal strength information is used to ensure that the ultimate pseudo base station signal to be transmitted will reach the mobile phone in the detection area with more power than the highest power pilot signal of the neighboring base stations.

The signal received at the receiving antenna 210 is transformed into a baseband signal through the first receiving filter 220 and the first frequency down-converter 230. The first receiving filter 220 searches the frequency bandwidth of 55 MHz by sequentially translating its passband in 1.25 MHz intervals, thereby capturing signals from all neighboring base stations. The baseband signal received on each 1.25 MHz frequency channel is despread by the forward demodulator 240. Overhead channel analyzer 250 decodes the despread signal to analyze the status of all neighboring base stations such as the strength of the pilot signal for each frequency channel, the zone number, system identifier and network identifier, etc. The analysis results for each frequency channel are stored in memory 260 and used to generate the pseudo base station signal.

The overhead channel signal being received from a given neighboring base station remains generally unchanged as long as the system configuration stays the same. Therefore, it is unnecessary for overhead channel analyzer 250 to operate at all times. Hence, to save operating power, apparatus 200 can be designed to demodulate signals, analyze overhead channels, etc., on a periodic basis rather than continually.

With continuing reference to FIG. 9, in step s120, signal generating unit 300 utilizes the zone information of the neighboring base stations stored in memory 260 to generate a pseudo base station signal that contains new zone information. The pseudo base station signal is an overhead channel signal generated by forward modulator 310, and includes a system identifier (SID), network identifier (NID), new zone number and new PN offset not used by any of the neighboring base stations, etc. Tables 1 and 2 below represent a message format that is typically used for transmission in the sync channel and the paging channel (of the pseudo base station signal as well as for neighboring base station signals). The forward modulator 310 generates the paging/sync channel signals for all paging frequency channels being used by the neighboring base stations.

TABLE 1

Sync Channel Message

| Field | Length (bits) |
|---|---|
| Message type '00000001' | 8 |
| System identifier (SID) | 15 |
| Network identifier (NID) | 16 |
| PN code offset (PILOT_PN) | 9 |
| System time (SYS_TIME) | 36 |

TABLE 2

System Parameter message of Paging Channel

| Field | Length (bits) |
|---|---|
| Message type '00000001' | 8 |
| PN code offset (PILOT_PN) | 9 |
| System identifier (SID) | 15 |
| Network identifier (NID) | 16 |
| Registration zone (REG_ZONE) | 12 |
| Zone timer (ZONE_TIMER) | 3 |

The pseudo base station signal is transmitted to a mobile phone in the detection area in step s130. Preferably, by employing object detector 305 as discussed above in the detection area vicinity, the pseudo base station signal is transmitted only upon the detection of an object. In this manner, the total RF emissions are reduced and electrical power is saved as well. If an object enters the detection area, object detector 305 sends a specific signal to signal generating unit 300, whereupon forward modulator 310 generates the pseudo base station signal. The modulated signal is up-converted, amplified and transmitted at an appropriate power level, e.g., a few milliwatts, to the mobile phone via antenna 350. At this time, the pseudo base station signal is generated and transmitted on all overhead channel frequencies used by the neighboring base stations. Thus, the forward modulator 310, up-converter 320, power amplifier 330, and filter 140 all operate at successive intervals of 1.25 MHz so as to generate and transmit the pseudo base station signal at all possible overhead channel frequencies in a short time interval. This ensures that the mobile phone, which is typically tuned to only one of the 1.25 MHz channels, will properly receive the pseudo base station signal.

In step s140, the mobile phone receives the pseudo base station signal and recognizes that it contains a new pilot signal with a higher power level than the highest power pilot signal currently being received. As a result, the mobile phone is tricked into beginning the location registration process to register with the new (pseudo) base station by tuning to the sync channel using the detected pilot signal. The mobile phone obtains timing information of the pseudo base station from the sync channel and searches the paging channel using the timing information to extract the desired base station information. It analyzes the area information included in the pseudo base station signal, in particular, the zone number, system identifier and network identifier, and compares those with the currently stored area information (from the last neighboring base station that the mobile phone registered with). Since the received area information is different from the stored area information, the mobile phone tunes to the pilot signal within the pseudo base station signal and then transmits a location registration signal to detection apparatus 100 to demand a location registration.

FIG. 10 illustrates a location registration signal transmitted by a mobile phone. To achieve location registration, the mobile phone transmits an access probe sequence including a plurality of probe signals repeatedly. Waveform (A) of FIG. 10 illustrates an access probe sequence in which probe sequence signals are repeatedly transmitted at time intervals T1. A maximum of 15 probe sequences are transmitted. As illustrated by waveform (B), each probe sequence contains up to sixteen access probes which are sequentially transmitted at time intervals T2, with each successive probe signal having a higher power level than the previous one by P1 power units. As illustrated by diagram (C), each access probe signal includes preamble and message portions each having a number of frames, e.g., 4 to 26 frames, each 20 ms in duration.

The mobile phone transmitting the above location registration signal is provided with various access parameters such as T1, T2, the number of frames in the access probe signal, the power level increment P1, etc. These access parameters are transmitted from the base station through the paging channel, and are determinative of the characteristics of the location registration signal to be transmitted. If general access parameters are used, it takes about one or two seconds for the base station to recognize the location registration signal transmitted from the mobile phone, assuming the location registration signal frequency band is known by the base station.

Returning to FIG. 9, in step s150, detecting unit 400 searches for and ultimately receives the location registration signal from the mobile phone via antenna 410. That is, the received signal from the antenna is applied to reverse demodulator 440 through the receiving filter 420 and down-converter 430. Reverse demodulator 440 despreads and demodulates the signal from down-converter 430 and then analyzes the modulated signal to determine if a location registration signal is present. When this signal is present, an alarm is generated by the alarm unit in step s160 to alert the person carrying the mobile phone or a supervisor that a mobile phone in Idle State is present and should be turned off.

The signal searching operation of step s150 will now be considered in more detail. Since the combined usable frequency band in the reverse channels of the cellular system and PCS systems is 55 MHz (i.e., 25 MHz plus 30 MHz, respectively), detection unit 400 may be designed to perform a search for a location registration signal within each 1.25 MHz frequency channel of the 55 MHz band. As a result, assuming a 1.5 second search in each frequency band, it would take about 66 seconds to search all the frequency channels (where (55/1.25)×1.5 seconds=66 seconds). The 66 second search time thus represents the maximum time needed to detect a location registration signal, assuming that the mobile phone may possibly be transmitting in the last frequency channel searched. However, 66 seconds is too much time to be allocated for detecting a mobile phone in most practical situations. One way to shorten the detection time is for signal generating unit 300 to change the access parameters.

Table. 3 below represents a format of an access parameter message transmitted by a base station through the paging channel.

TABLE 3

Access Parameter Message Format

| Field | Length (bits) |
|---|---|
| Message type '00000010' | 8 |
| PILOT_PN | 9 |
| ACC_MSG_SEQ | 6 |
| ACC_CHAN | 5 |
| MAX_CAP_SZ | 3 |
| PAM_SZ | 4 |
| ACC_TMO | 4 |
| PROBE_BKOFF | 4 |
| BKOFF | 4 |

To shorten the time required to detect the transmission of a location registration signal by the mobile phone, the access parameters can be changed. In this case, the signal-generating unit 300 transmits the paging channel signal of the pseudo base station signal with new access parameters. In particular, signal-generating unit 300 adjusts the time variables T1 and T2 to shorten the time required to recognize the location registration signal of the mobile phone.

In general, CDMA service providers are allocated forward and reverse channel bandwidths as wide as 10 MHz, to enable use of eight frequency channels in total. Practically, however, the service providers use only one or three frequency channels. Therefore, if only the one or three frequency channels in current use are searched when signal-generating unit 300 generates a pseudo base station signal and detecting unit 400 detects the location registration signal, the search time can be shortened by ⅝ to ⅞ as compared to the case in which all available frequency bands are searched.

Also, as the probability is high that the mobile phone in Idle State is already tuned to one of the neighboring base stations, detection apparatus 100 can be designed to operate, at any given time, only at the frequency or frequencies being used in the neighboring base station(s), rather than at all forward channel frequencies. In this manner, the search time required by detecting unit 100 to detect the location registration signal from the mobile phone can be shortened dramatically, since the search need only be performed at one or several frequency channels. Additionally, if detection apparatuses for the cellular PCS systems are configured in parallel, i.e., with one detection unit operating at the cellular band and the other operating independently at the PCS band, the search time can be further shortened.

From the foregoing, it should be readily appreciated that embodiments of the present invention render it possible to call a person's attention to the use of his/her mobile phone within a specific detection area in advance by detecting if the mobile phone in Idle State passes through the specific detection area. Consequently, it is possible to prevent public injury and the possibility of causing electronic equipment to erroneously operate by restricting mobile phone use in a specific area. In addition, embodiments of the present invention makes it possible to more precisely detect a mobile phone in Idle State by recognizing a location registration signal of the mobile phone as soon as possible.

While the invention is susceptible to various modification and alternative forms, specific embodiments thereof have been shown by way of example in the drawings and have been described hereinabove in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. An apparatus for detecting a mobile phone in an idle state comprising:
   a signal-generating unit for generating a pseudo base station signal based on zone information of neighboring base stations for transmission to a mobile phone in a detection area;
   a detecting unit adapted to detect a response signal that a mobile phone transmits in response to the pseudo base station signal; and
   an alarm-generating unit for generating an alarm when said detecting unit detects said response signal.

2. The apparatus as set forth in claim 1, wherein said zone information includes Pseudorandom Noise (PN) code offset, zone number, a system identifier (SID) and a network identifier (NID).

3. The apparatus as set forth in claim 1, wherein said signal-generating unit generates said pseudo base station signal using a system reference clock derived from a Global Positioning System (GPS) receiver, said GPS receiver receiving time-information from GPS satellites to generate the system reference clock.

4. The apparatus as set forth in claim 1, further including circuitry for analyzing neighboring base stations, said circuitry being adapted to receive signals transmitted by neighboring base stations in an overhead channel and extract neighboring base station information therefrom, wherein said signal-generating unit generates said pseudo base station signal based on said neighboring base station information.

5. The apparatus as set forth in claim 4, wherein said circuitry for analyzing neighboring base stations comprises:
   (a) a first receiving antenna for receiving radio frequency (RF) signals through the overhead channel from neighboring base stations;
   (b) a first receiving filter to filter said received RF signals;
   (c) a first frequency down-converter to convert the filtered signal to a baseband signal;
   (d) a forward demodulator to demodulate the baseband signal by despreading; and
   (e) an overhead channel analyzer to analyze the demodulated signal and generate said neighboring base station information.

6. The apparatus as set forth in claim 4, wherein said extracted neighboring base station information includes transmit frequency status, pilot signal strength and PN code offset.

7. The apparatus as set forth in claim 1, wherein said signal-generating unit comprises:
   (a) a forward modulator for generating an overhead channel signal using the reference clock received by said GPS receiver;
   (b) an up-converter for converting the overhead channel signal to an RF signal in a frequency band of a code division multiple access (CDMA) system;
   (c) a transmit power amplifier for amplifying the RF signal;
   (d) a transmitting filter for filtering the amplified signal; and
   (e) a transmitting antenna for transmitting the filtered signal as said pseudo base station signal.

8. The apparatus as set forth in claim 7, wherein said transmit power amplifier amplifies the RF signal to a power level of only several milliwatts, so as to prevent interference with electronic equipment outside a specific detection area.

9. The apparatus as set forth in claim 7, wherein said transmitting antenna transmits an overall forward frequency band of said CDMA system, and forms a narrow beamwidth directed towards a specific detection area.

10. The apparatus as set forth in claim 1, wherein said apparatus transmits said pseudo base station signal in response to a signal from an object detector indicating that an object is within a specific detection area.

11. The apparatus as set forth in claim 1, wherein said detecting unit comprises:
   (a) a second receiving antenna for receiving radio frequency (RF) signals through an access channel from a mobile phone in Idle State;
   (b) a receiving filter for filtering said received RF signals;
   (c) a down-converter for converting the filtered signal to a baseband signal; and
   (d) a reverse demodulator for despreading and demodulating the baseband signal and forwarding an alarm signal to an alarm-generating unit when said response signal of the mobile phone is detected within said demodulated signal.

12. The apparatus as set forth in claim 11, wherein the frequency separation, at a given time, between a passband of said receiving filter and a transmitting filter of said signal generating unit that filters said pseudo base station signal, is selected from the group consisting of 45 MHz and 90 MHz.

13. The apparatus as set forth in claim 11, wherein said receiving filter and a transmitting filter of said signal generating unit that filters said pseudo base station signal each have a passband of 1.25 MHz.

14. The apparatus as set forth in claim 1, wherein said signal-generating unit comprises:
   (a) circuitry for generating said pseudo base station signal at frequencies and a protocol of a code division multiple access (CDMA) cellular system; and
   (b) circuitry for generating said pseudo base station signal at frequencies and a protocol of a CDMA personal communication service (PCS) system,
   and wherein said detecting unit comprises:
   (a) circuitry for detecting a signal that said mobile phone transmits at frequencies and a protocol of a CDMA cellular system; and
   (b) circuitry for detecting a signal that said mobile phone transmits at frequencies and a protocol of a CDMA personal communication service (PCS) system.

15. The apparatus as set forth in claim 1, wherein said detection area is an entranceway.

16. An apparatus for detecting a mobile phone in an idle state comprising:
   (a) a GPS receiver for receiving time information from a satellite and generating therefrom a system reference clock;
   (b) a signal-generating unit for generating a pseudo base station signal based on zone information of neighboring base stations for transmission to said mobile phone in said idle state in a specific detection area, said pseudo base station signal causing said mobile phone in said idle state to transmit location registration signals;
   (c) a detecting unit for detecting said location registration signals; and
   (d) an alarm-generating unit for generating an alarm when said detecting unit detects said location registration signals.

17. The apparatus as set forth in claim 16, wherein said signal-generating unit generates said pseudo base station signal based on neighboring base station information received through overhead channels transmitted by said neighboring base stations.

18. The method of claim 17, wherein said pseudo base station signal is transmitted in a standard overhead channel of a wireless communications system.

19. A method for detecting a mobile phone in an idle state, said method comprising the steps of:
(a) transmitting a pseudo base station signal within a detection area, using zone information of neighboring base stations to generate said pseudo base station signal, and said pseudo base station signal causing said mobile phone in said idle state in said detection area to transmit a response signal; and
(b) receiving said response signal from said mobile phone and generating an alarm.

20. The method of claim 19, wherein said pseudo base station signal includes a pilot channel signal which is transmitted at a power level sufficient for a mobile phone in said detection area to receive said pilot channel signal with more power than pilot channel signals of all neighboring base stations in the vicinity of said detection area.

21. A method for detecting a mobile phone in an idle state, said method comprising the steps of:
(a) generating a pseudo base station signal by a signal-generating unit using zone information of neighboring base stations, said pseudo base station signal having new zone information;
(b) transmitting said pseudo base station signal to a mobile phone within a detection area;
(c) receiving said pseudo base station signal and transmitting a location registration signal to a detecting unit by a mobile phone in said idle state;
(d) receiving the location registration signal from the mobile phone by said detecting unit; and
(e) generating an alarm when said detecting unit receives the location registration signal from said mobile phone.

22. The method as set forth in claim 21, wherein said step of generating a pseudo base station signal comprises the steps of:
(a) receiving an overhead channel signal from a base station located near the detection area; and
(b) obtaining information of neighboring base stations by analyzing the received overhead channel signals.

23. The method as set forth in claim 22, wherein the step of receiving an overhead channel signal includes tuning to all possible overhead channels used by base stations of a code division multiple access (CDMA) system.

24. The method as set forth in claim 21, wherein the step of generating a pseudo base station signal is performed when an object detection signal is received from an object detector indicating that an object has entered the detection area.

25. The method as set forth in claim 21, wherein said pseudo base station signal is generated having time-related access parameters of an access channel in which said mobile phone transmits said location registration signal, said time-related access parameters being sufficient to reduce transmission-time for the location registration signal of said mobile phone.

26. The method as set forth in claim 21, wherein said pseudo base station signal is generated sequentially in a plurality of overhead frequency channels of a code division multiple access (CDMA) system.

27. The method as set forth in claim 21, wherein the step of receiving the location registration signal is performed by sequentially tuning to different frequency channels to enable reception of said location registration signal in any one of said different frequency channels.

28. The method as set forth in claim 21, wherein the step of receiving the location registration is performed by sequentially tuning only to access frequency channels being used in base stations located near the detection area, to enable reception of said location registration signal in any one of said frequency channels.

* * * * *